July 29, 1941. P. W. PIERCE 2,250,602
HONEY UNCAPPING KNIFE
Filed Aug. 21, 1939
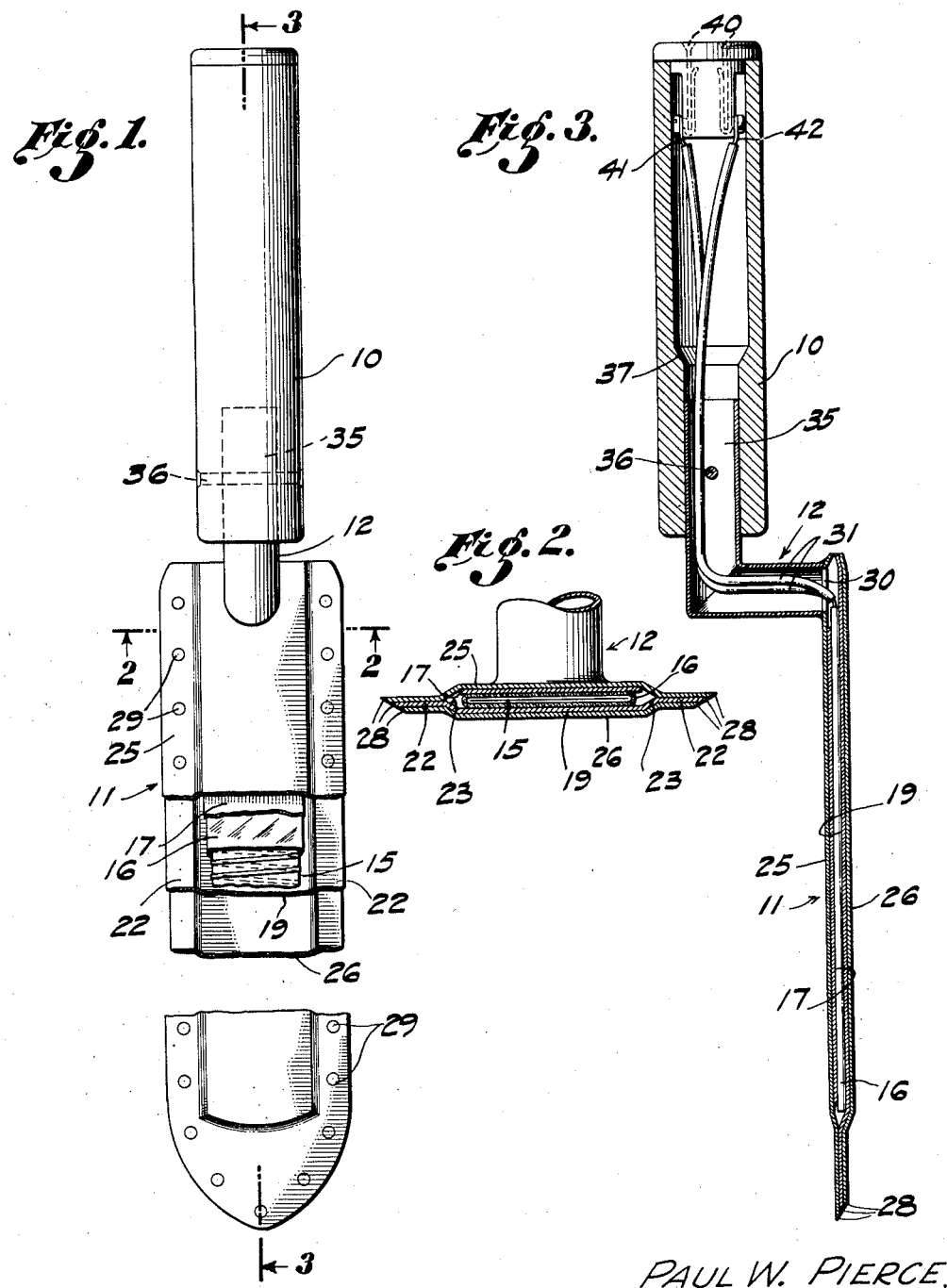
PAUL W. PIERCE,
INVENTOR
ATTORNEY Patented July 29, 1941

2,250,602

UNITED STATES PATENT OFFICE 2,250,602

HONEY UNCAPPING KNIFE

Paul W. Pierce, Altadena, Calif.

Application August 21, 1939, Serial No. 291,115

5 Claims. (Cl. 30—140)

My invention relates to a device for maintaining in a heated condition a knife that is being used to cut away the cap portion of honey combs.

In the use of knives for uncapping honey combs, the blade of the knife needs to be heated in order to lessen the friction caused by passing the knife through the honey and wax. Various means, including steam and electricity, have heretofore been used to accomplish this purpose. When using a steam heated knife, steam is generated in a boiler, and the boiler is connected to the interior of a hollow knife blade by means of rubber tubing. The steam is also carried away from the knife by means of a second rubber tubing.

When an electric knife is used, a nickel chromium wound element is placed inside the knife blade, the lead wires passing out through the handle of the knife through a connection whereby they are supplied with current.

The following disadvantages result from the use of the steam heated and the electrically heated knives: The knife may cut very well for the first few inches but drags harder and harder as it nears the end of the cutting stroke. Also, the blade cools off most rapidly near the cutting edge, and will often be cold there at the end of the first cutting stroke while it is still quite hot near the center of the blade. The heat comes from the mid-width portion of the knife, and in most knives a large per cent of the heat never reaches the cutting edge due to the absorption of the heat by the cool honey passing over the upper face of the blade.

A still further objection to knives for use in uncapping honey combs has been that they usually are made too heavy to be used with comfort in commercial production, where the operator finds it necessary to hold the knife in his hand all day.

The foregoing objections have to a great extent been overcome in the knife by this invention, this being accomplished by conducting the heat to the cutting edge of the knife in a more direct manner whereby the heat carrying agency is prevented from coming in close contact with the honey except along the portion of the knife blade adjacent to its cutting edge; by stamping the knife blade out in a different manner, thus making it possible to use metal strips of a thinner gauge.

It is also an object of the invention to provide an improved means for securing together the blade and handle portions of the knife, thus lessening the danger of the blade loosening from the handle.

Still other objects of the invention pertain to the provision of a more durable, dependable construction which is comparatively free from any appendages tending to incumber the device or lessen the ease which which it may be operated.

Other objects, advantages, and features of invention will hereinafter appear.

Referring to the accompanying drawing which illustrates what is at present deemed to be a preferred embodiment of the invention, Fig. 1 is a side elevation of the complete device portions of the composite knife blade being broken away at different levels in order to disclose interior construction more clearly, and intermediate portion of the blade being broken away in order to contract the length of the view.

Fig. 2 is a cross section taken on line 2—2 of Fig. 1, the handle portion of the knife being broken away through the shank thereof.

Fig. 3 is a longitudinal mid-section taken on line 3—3 of Fig. 1.

Referring in detail to the drawing, the knife is furnished with a tubular handle 10 and with a composite blade structure 11 which is united with said handle, in an offset relation thereto by means of an angular, tubular shank 12.

The composite blade structure 11 is furnished with a central strip of electrically energized heat generating material 15, desirably a piece of wire-wound mica which may be constructed in any manner well known to the electrician, and therefore need not be described in detail. Said mica strip is enveloped within a heat generating metal sheath 16. Over the upper side of said sheath (the side of Fig. 1 nearest to the observer) is placed an aluminum strip 17 which overlies all portions of said sheath 16.

The parts of the composite blade structure which have thus far been described are seated upon a copper strip 19 which is of a flat character, except that it has upwardly offset edged portions 22 which are joined to its body portion by means of upwardly inclined intermediate strips 23. Said parts of the composite blade structure are gripped between an upper knife blade strip 25 and a similarly shaped lower knife blade strip 26, said lower strip being made of a mild steel, and said upper strip being made of a harder steel. As viewed in cross section, the strips 25 and 26 are oppositely dished so as to provide between them the requisite amount of space for the interior construction composite blade.

By the construction which has been described, three super-imposed layers of metal are provided along each of the long edges of the knife blade. Each of the edge portions of these strips is furnished with a bevel 28, each of these bevels looking downwardly so as to provide the cutting edge adjacent to the upper surface of the knife blade. The super-imposed strips 25, 19, and 26 are united along their edge portions by a series of spot welds 29.

The angular shank 12, which has already been mentioned, is welded or otherwise secured to the mid-width portion of the upper face of the back part of the upper steel plate 25, an aperture 30 being provided through said upper plate at this point to admit the electric cables 31 for supplying current to the heating element.

The body portion 35 of the angular, tubular shank 12 is fitted within the tubular handle 10 and is secured in place therein by means of a king pin 36. Said handle 10 has its internal diameter enlarged by means of an annular shoulder 37 which separates the part of the handle which contains the shank 35 from the remainder thereof. Said handle is composed of any suitable insulating material and need not be described in further detail except to say that it contains a pair of conventional terminals 40 for plug-in purposes which supply the electric current to the wires 41 and 42 of the cables 31.

The amount of heat reaching the mid-width portion of the top plate 25 of the composite knife blade is regulated by the aluminum conductor strip 17, which prevents too great a concentration of the heat in any particular area, and which guards against said top plate becoming so hot as to scorch the honey. Keeping the top plate of the blade from becoming overheated is particularly important, because in use that is the portion of the knife which comes in contact with the honey during the uncapping operation, and therefore heat injurious to the honey can be conducted only from the upper surface of the blade. The aluminum strip 17 also stiffens and stabilizes the blade structure. It fills in the space at the side of the heating element opposite to the copper strip 19 and permits the thinner metal being used for the outer plates.

The metal used in constructing the composite blade will normally be iron or steel, but metals having a greater or less degree of heat conductivity may be used in the manufacture of the blade when it is desired to provide for heating blades to be used for cutting other substances than honey. In the latter case, it may be necessary to vary the substance of the aluminum plate to correspond.

Owing to the efficient and economical manner in which this invention provides for conducting the heat to the edge portions of the blade, a less amount of electric current need be supplied to heat the knife to a desired extent.

It should be understood that the present disclosure is for the purpose of illustration only, and that this invention includes all modifications and equivalents which fall within the scope of the subject matter claimed.

What is claimed is:

1. In a knife construction of the kind described, a hollow bladed knife adapted to properly receive and utilize the heat from a heating element, handle means for said knife, a copper strip underlying said heating element, and two exterior blade portions for said knife, said blade portions being secured together with the edge portion of said copper strip being extended to a point wherein it forms a common bevel with said blade portions and heats the edge performing the cut.

2. In a knife construction of the kind described, a blade structure adapted to properly receive and utilize the heat from a heating element consisting of an aluminum strip covering one side portion of said heating element, handle means for said structure arranged to maintain said aluminum strip on the upper side of said heating element while the knife is in use, a copper strip at such time underlying said heating element, and two exterior blade portions for said knife consisting of strips having opposed dished faces, said blade portions being secured together in a position to house the remaining portion of the blade structure between their dished faces, said copper strip extending the entire width of the composite knife blade, producing a three-ply metal along a cutting edge of the knife, said edge being beveled to sharpen it.

3. In a knife structure of the kind described, an elongated blade structure including upper and lower strips having dished faces directly towards each other and having contracting edge portions secured to each other adapted to receive between the dished faces of said strips a heating element, an aluminum strip positioned between one side of said heating element and the adjacent dished strip, an element having a greater heat conductivity than either of said upper and lower metal strips mounted adjacent said heating element to be heated thereby, said element extending out to a point wherein it heats the cutting edge of one of said metal strips, and handle means for the blade structure attached thereto by a shank portion whereby said handle means is offset from the blade of the knife toward the side thereof occupied by said aluminum strip.

4. In a knife construction, a composite blade structure adapted to properly receive and utilize the heat from a heating element, a copper strip contacting with one side of said heating element to be heated thereby, said strip extending out to a cutting edge of the blade, metal side plates for said blade of less heat conductivity than said copper strip, and means to unite along the edge portion of the knife blade said three strips in a superposed relation.

5. In a knife structure of the kind described, two similarly shaped metal strips at least one of which is recessed along one side, said strips being secured to each other in a manner causing the recessed part to form a chamber for containing a heating element, an elongated strip of metal of high heat conductivity interposed between one of said metal strips and said heating element, said interposed strip extending out to and along a cutting edge portion of the knife, all three of said strips having a common bevel whereby said cutting edge is produced, means to unite along the edge portion of the knife blade said three strips in a superposed relation, and handle means for the knife.

PAUL W. PIERCE.